Sept. 1, 1964      K. GOLÜCKE ET AL      3,146,998
METHOD AND APPARATUS FOR PREHEATING OF FINE-GRAIN MATERIAL
Filed Oct. 19, 1961
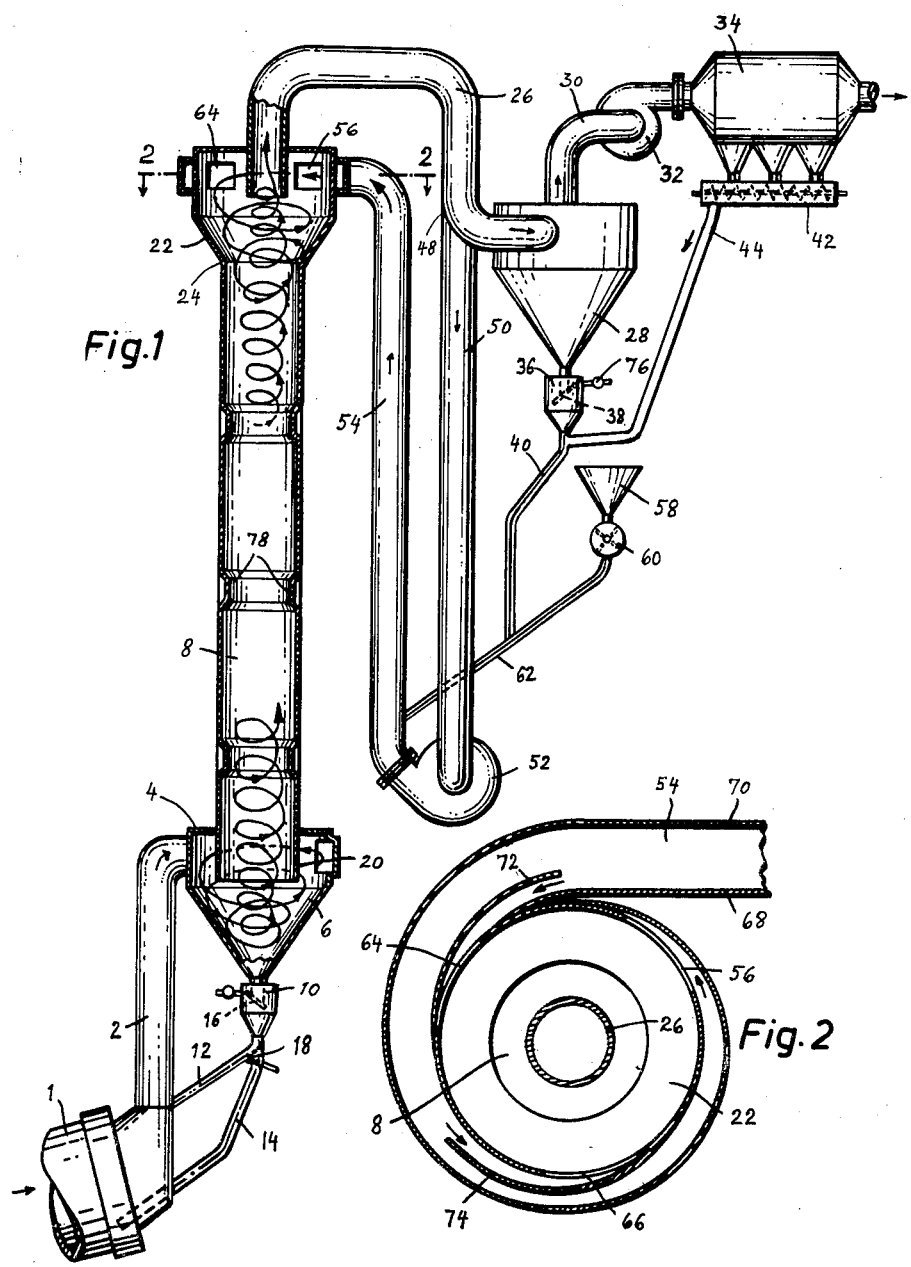
INVENTORS:
*Karl Golücke*
*Franz Müller*
BY *Nolte & Nolte*
*Attorneys*

United States Patent Office 3,146,998
Patented Sept. 1, 1964

3,146,998
METHOD AND APPARATUS FOR PREHEATING OF FINE-GRAIN MATERIAL
Karl Golücke, Bensberg, and Franz Müller, Bensberg-Refrath, Germany, assignors to Klockner-Humboldt-Deutz Aktiengesellschaft, Cologne-Deutz, Germany
Filed Oct. 19, 1961, Ser. No. 146,242
Claims priority, application Germany Oct. 22, 1960
15 Claims. (Cl. 263—21)

This invention relates to method and apparatus for the heating of fine-grained material, such as raw cement powder, through direct contact with a hot gas, which is flowing in countercurrent to the fine-grained material.

It is known to heat a fine-grained material through direct contact with a hot gas flowing in a direction opposite to the flow of the material. According to such known methods, the material to be heated is introduced at the top of a vertically disposed, substantially cylindrical shaft-furnace and the material is in intimate contact with the combustion gases which are introduced at the bottom of the shaft furnace and move upwards in an approximately helical path. The countercurrent type process is more advantageous than other known methods according to which the material is led concurrently, i.e. in the direction of flow of the combustion gases. In countercurrent processes the material can be heated to a substantially higher temperature, which approximately equals the temperature at which the combustion gases enter.

However, the known countercurrent methods for heating fine-grained materials have a serious drawback. The combustion gases are usually tangentially introduced into the shaft furnace, whereby they pick up the material and carry it with them, so that a major part of the material is blown out from the shaft together with the gases.

It is an object of the invention to provide an apparatus and a method for heating fine-grained materials by a countercurrent process in a shaft furnace, without the attendant drawbacks and disadvantages of the known methods.

Other objects and advantages of the invention will become apparent from the following detailed description.

The improvement over the known methods is accomplished by combining a cyclone with the bottom of the shaft in such a manner that the bottom end of the shaft is at the same time the gas-outlet pipe of the cyclone. The fine-grained material which trickles downwards from the top of the shaft, along its walls, and is heated by the upward streaming gases, reaches the lower edge of the shaft and comes into contact with the eddy of gases at that point. Due to the centrifugal force imparted by the gas in turbulent motion, the material is spun onto the walls of the cyclone and, upon impact therewith, loses its energy and thus can be separated at the apex of the cyclone and passed on to some intended application. The combustion gases leave the cyclone in an upward direction through the bottom of the shaft.

It is important for the desired operation of the furnace that the solid material be fed at its top in such a manner that it should trickle down evenly along the walls. This is accomplished, according to the invention, by creating somewhat similar flow conditions for the gas at the top, as the ones existing at the bottom of the shaft. An auxiliary gas stream is tangentially introduced at a cyclone-like conical widening at the top of the shaft. This auxiliary gas then spins the entering material onto the sides of the conical widening whereby the material can commence its downward trickle along the walls of the shaft. The auxiliary gas stream enters tangentially, in the same direction as the upward streaming gas, and then leaves the furnace jointly therewith. The material is introduced together with the auxiliary gas stream. This method has also the advantage of effecting continuous and uniform introduction of the solid material into the furnace, for which pneumatic methods of transport are known.

The length of the cylindrical shaft should preferably be several times greater than the length of the bottom cyclone, since on the length of said part depends the effective heat exchange.

An embodiment of the present invention it should, however, be understood is shown by way of illustration and not of limitation and many changes in the details can be made without departing from the spirit of the invention.

In the drawing, FIG. 1 shows partially in section a schematic view of the shaft furnace and ancillary devices; and FIG. 2 is a section taken along line 2—2 of FIG. 1, shown on an enlarged scale.

The embodiment of the invention, as shown in FIG. 1, is arranged as a preheater to the inlet opening 1 of a rotary kiln (not shown). The combustion gases leaving the rotary kiln are conducted through a pipe 2, which is tangentially connected to the upper part 4 of a cyclone 6, which forms the bottom of a shaft 8. The outlet 10 for the material at the apex of cyclone 6 is connected through a pipe 14 to the material inlet opening 1 of the rotary kiln. A pipe 12 is connected to the pipe 2. A closure member 16 is provided for the outlet opening 10, and a control flap 18 is provided at the apex of pipes 12 and 14. The bottom end 20 of the shaft 8 protrudes into cyclone 6. The shaft 8 at its upper end is integral with a cyclone-like extension 22, the apex outlet 24 of which is at the same time the upper end of the shaft. A gas outlet pipe 26 of cyclone 22 is connected at its other end to a separating cyclone 28. The gas outlet 30 of cyclone 28 is connected through a fan 32 to an electrostatic filter 34.

The outlet 36 for the solid material of cyclone 28 is connected to a pipe 40, with interposition of a closure member 38. The material collecting portion 42 of electrostatic filter 34 has a material outlet pipe 44. This pipe can be either connected to pipe 40 (as shown in FIG. 1) or pipe 2. The pipe 26 before entering cyclone 28, branches off at a point 48 into a pipe 50 which leads to the suction end of a fan 52, the pressure end of which is connected through a pipe 54 with the material inlet of cyclone 22 forming the top part of shaft 8.

A feeder 58, including a bucket wheel 60 is connected through a pipe 62 to material inlet pipe 54. The pipe 40 of the cyclone 28 is also connected to the pipe 62.

The upper end of cyclone 22 is preferably formed in a manner, to be described in connection with FIG. 2. It is preferred that the gas and material entering from the pipe 54 into the cyclone 22 should be subdivided into partial streams of substantially identical magnitudes which are fed into the cyclone tangentially at several points of its circumference. According to the example shown in FIG. 2, three openings 56, 64 and 66 are provided. The pipe 54 is connected to cyclone 22 in such a manner that the inner wall 68 of the pipe, when viewed towards the direction of flow, terminates tangentially to the opening 64; and the outer wall 70 is tangential with respect to the opening 56. Baffle plates 72 and 74 are provided to channel approximately one-third of the flow through each of the openings 56, 64 and 66. The baffle plates 72 and 74 are attached in a tangential manner at their one end to the pipe 26.

In operation, the gases are exhausted from the rotary kiln through its material inlet opening 1 by the aid of fan 32. The gases flow through pipe 2 and enter cyclone 6 in a tangential manner at 4. The velocity of the gases entering the cyclone is at about 20 m./sec. and due to their tangential entry, they start to whirl within the cyclone. As the powdered material trickles down in shaft 8, when it reaches the bottom edge of the shaft, the whirling gases spin it onto the walls of the cyclone where the particles lose their kinetic energy and settle in the direction of the apex of the cyclone 6. The gases leave the cyclone 6 through the bottom 20 of the shaft 8 and progress upwards therein in the above-mentioned whirling manner. The vertical tangential component of the velocity of the stream is materially higher than its horizontal component. The magnitudes of these components depend on the specific gravity and grain size of the solid material trickling down the walls of shaft 8 and are preferably at about 20 m./sec. in vertical direction and at about 4 m./sec. in horizontal direction.

The upward whirling gases are sucked through shaft 8 and the upper adjoining cyclone 22 and are exhausted through pipe 26. Since in the embodiment shown, pipe 26 branches off at 48, the gases leaving the cyclone 22 also branch off and one part proceeds to cyclone 28 under the suction of fan 32, while the other part proceeds along pipe 50 under the suction of fan 52. The gases entering cyclone 28 unload their solid material content and leave through the exhaust opening 30, thereby reaching the electrostatic filter 34, passing through fan 32. Any fine dust that would not have been separated in cyclone 28, is finally filtered out from the gas in the electrostatic filter 34, from where it is exhausted into the atmosphere. Under certain conditions, cyclone 28 and/or electrostatic filter 34 can be substituted by other suitable precipitating means, such as ultrasonic separators, etc.

The raw cement powder is introduced through feeder 58 and bucket wheel 60 into pipe 62. The bucket wheel 60 is adapted to continuously feed equal portions of the material into the system while maintaining independent pressure conditions at its two ends.

The material in pipe 62 is joined by material leaving cyclone 28. As the material settles in the apex of cyclone 28, it collects above the closure member 38 having a counterweight 76. The outlet opening remains closed, until enough material collects to counteract the weight 76; then the member 38 will open and material is released through pipe 40 into pipe 62 joining the material therein. The material proceeds by action of gravity to pipe 54, on the pressure side of fan 52, and is blown tangentially into cyclone 22 at the upper end of shaft 8.

As the gases and material entering cyclone 22 obtain a whirling motion on their path, the material is spun onto the walls of cyclone 22 from where it begins to trickle downward. Tangential inlet openings 56, 64 and 66 serve to evenly distribute the material around the circumference of cyclone 22 and shaft 8. Since the gases blown in with the material rotate in the same direction as the gases progressing upward through shaft 8, the two streams of gas join below the end of pipe 26 and leave the cyclone through this pipe.

As the material trickles downward within shaft 8, it is constantly in intimate contact with the hot combustion gases on their upward travel. The spiraling stream of gases maintains the material in the proximity of the walls of shaft 8. In this manner, an aerosol-like fine cushion of power trickles downward and good heat exchange between combustion gases and the material is accomplished. As the material trickles downward, it contacts gases having an increasingly higher temperature. The longer the length of the shaft and the slower the downward travel of the material, the higher becomes the temperature at which the powder leaves shaft 8. A practical limitation to the length of shaft 8 is at about 10 to 15 meters. If this length is not satisfactory for obtaining a material exit temperature of 700–750° C., then it is preferred to slow the trickling rate of the material in shaft 8 by e.g. ring-or-spiral-shaped retarding baffles 78.

As the hot material leaves shaft 8 at point 20, the gases entering cyclone 6 at point 4, in a tangential manner, spin the particles towards the walls of cyclone 6 where they commence to settle towards the apex 10 of the cyclone. The material there is fed through closure member 16, either through pipe 14 into the rotary kiln through the material inlet opening 1, or through pipe 12 into pipe 2. The proportion of flow of the material can be controlled between pipes 12 and 14 by the aid of control flap 18. The material channeled from pipe 12 into pipe 2 is picked up by the hot gases leaving the rotary kiln, and reprecipitated in the cyclone 6. The temperature of the gases leaving the rotary kiln is in the neighborhood of 1100–1200° C.

The recirculation of part of the material through pipe 12 serves to maintain an equilibrium of material distribution at both ends of the shaft 8. In this way the proportion of recirculated and newly fed material can be controlled over a wide range. Preferably, this proportion is maintained around 1, but it can be more or less than 1, such as, for example, 0.5, or 2. Since the material joining pipe 2 through pipe 12 contacts the combustion gases at their highest temperature, the sensible heat of the gases in pipe 2 will decompose the carbonates of the raw cement powder and the temperature of the gases entering the cyclone 6 is thus lowered to the neighborhood of approximately 800° C. Since a considerable amount of $CO_2$ is liberated from the material in this way, a correspondingly lesser heat requirement has to be provided for in the rotary kiln, therefore, the material can be driven at a greater rate later through it.

If the process can be controlled in a manner that the gases leaving through pipe 26 contain only very small amounts of powdered material, then cyclone 28 and pipe 50 can be eliminated and pipe 26 can be directly attached to the exhaust opening of fan 32. In this case, the material can be carried into cyclone 22 by air, as provided by fan 52.

It is to be understood that the method and the apparatus, as described above, can be successfully employed for the heating of solid fine-grained material other than raw cement powder and the layout and design of the embodiment described by way of example can be altered and modified by an expert in the art, therefore, the full scope of the invention is to be interpreted from the appended claims.

What I claim is:

1. A method for preheating a substantially fine-grain material, comprising the steps of introducing the material with a stream of auxiliary gas in a tangential manner at the top of a shaft, separating said material from said auxiliary introducing gases, trickling said material downward in said shaft in a substantially non-turbulent flow, introducing hot gases, in a tangential manner, at the bottom of said shaft, whirling said hot gases upward in said shaft whereby said downward trickling material is heated by said upward whirling gases, collecting said material at the bottom of said shaft, separating said material from said gases being introduced at the bottom of said shaft, joining said upward whirling gases with said auxiliary introducing gas in the vicinity of the top of the shaft, and exhausting said joined gases at the top of said shaft.

2. A method according to claim 1, further comprising the steps of separating said joined gases, admixing more substantially fine-grain material to one part and recirculating said gas-material mix at the top of said shaft in said tangential manner.

3. A method according to claim 2, further comprising the steps of separating the substantially fine-grain material carried by the other part of said parted gases and mixing said separated material to said recirculating gas-material mix.

4. A method according to claim 1, further comprising the steps of parting said collected material at the bottom of said shaft, admixing one part thereof to said hot gases being introduced at said bottom of said shaft and transporting the other part of said collected materials away.

5. A method according to claim 4, further comprising the steps of introducing said other part of said collected material into a cement-firing kiln and withdrawing said hot gases for said introduction with said one part of said collected material from said cement-firing kiln.

6. An apparatus for the preheating of substantially fine-grain material by conducting the material against a current of hot gases, comprising feeding means for said material, shaft means, and means for introducing said hot gases and for separating said material therefrom, said material feeding means being disposed at the top of said shaft means, and said gas-introducing material-separating means being disposed at the bottom end of said shaft means and including a cyclone means having an upper gas inlet end surrounding and of a larger diameter than said bottom end of said shaft means, said bottom end of said shaft means extending into said cyclone means, forming a gas outlet for said cyclone means and delivering material to gases entering said cyclone means to be centrifugally deposited by said gases on a wall of said cyclone means before the gases rise up into said shaft means.

7. An apparatus according to claim 6, wherein said material-feeding means comprises an upper cyclone means having a material outlet and a material-gas inlet, said material outlet being integral with said shaft means.

8. An apparatus according to claim 7, further comprising material feeding means and pneumatic means, said material feeding means being connected to one end of said pneumatic means, the other end of said pneumatic means being connected to said upper cyclone means.

9. An apparatus according to claim 6, wherein said cyclone means has a material outlet and further comprises material-separating means and separating control means connected to the material outlet of said cyclone means for controlled separation of said material from said cyclone means.

10. An apparatus according to claim 9, wherein said material-separating means includes a plurality of pipes interconnected at one end thereof and connected to said separating control means at said interconnected one end, at least one of said pipes being connected at the other end thereof to the gas-inlet end of said cyclone means.

11. An apparatus according to claim 6, wherein said shaft means includes baffle means ranging partially into the interior of said shaft means for slowing the progress of said material within said shaft means.

12. An apparatus according to claim 6, wherein the length of said shaft means is a multiple of the length of said cyclone.

13. An apparatus for the preheating of substantially fine-grain material by conducting the material against a current of hot gases, comprising feeding means for said material, shaft means and means for introducing said hot gases and for separating said material therefrom, said material feeding means being disposed at the top of said shaft means, and said gas-introducing material-separating means being disposed at the bottom end of said shaft means, said material-feeding means comprising a cyclone means having a material outlet and a material-gas inlet, said material outlet being integral with said shaft means and gas outlet means, gas-separating means and material-admixing means, one end of said gas outlet means being connected to said cyclone means for exhausting said current of gases, said gas-separating means being connected to the other end of said gas outlet means and including a pair of conduits branching from said gas outlet means for separating said current of gases into two parts, respectively, and said material-admixing means being connected to one of said conduits carrying one part of said separated gases for mixing new material to said one part of said separated gases and introduction thereof into said cyclone means.

14. Apparatus according to claim 13, further comprising optional separating means connected to the other conduit carrying the other part of said separated gases for cleaning of said other part of gases before releasing it into the atmosphere and for reclaiming solid material carried by said other part of separated gases.

15. An apparatus for the preheating of substantially fine-grain material by conducting the material against a current of hot gases, comprising feeding means for said material, shaft means and means for introducing said hot gases and for separating said material therefrom, said material feeding means being disposed at the top of said shaft means, and said gas-introducing material-separating means being disposed at the bottom end of said shaft means, said material-feeding means comprising a cyclone means having a material outlet and a material-gas inlet, said material outlet being integral with said shaft means, said cyclone means including inlet means comprising a plurality of substantially circumferentially equally disposed openings, and tangentially disposed baffles, relative to said openings for equal distribution of said introduced material around the circumference of said cyclone means.

References Cited in the file of this patent

UNITED STATES PATENTS

| | | |
|---|---|---|
| 2,316,207 | Winter | Apr. 13, 1943 |
| 2,634,116 | Witt | Apr. 7, 1953 |
| 2,770,543 | Arnold et al. | Nov. 13, 1956 |
| 2,866,625 | Sylvest | Dec. 30, 1958 |
| 2,911,730 | Schaub et al. | Nov. 10, 1959 |
| 3,067,990 | Zacpal | Dec. 11, 1962 |

FOREIGN PATENTS

| | | |
|---|---|---|
| 758,176 | Great Britain | Oct. 3, 1954 |